United States Patent Office 2,726,177
Patented Dec. 6, 1955

2,726,177
LAMINATING IMPREGNANT AND PROCESS

Baak W. Lew, Ardentown, Del., assignor to Atlas Powder Company, Wilmington, Del., a corporation of Delaware No Drawing. Application July 28, 1954,
Serial No. 446,393

11 Claims. (Cl. 117—161)

This invention relates to the preparation of cellulosic laminating stock and more particularly to compositions for impregnating laminating stock.

It is an object of the invention to provide novel resin-containing emulsions.

A further object is to provide a process for impregnating cellulosic laminating stock with resinous compositions.

Another object is to provide water-in-oil emulsions containing both polymerizable polyester resin compositions and water-soluble melamine-formaldehyde condensation products.

The above and other objects will become more apparent in the course of the following description of the invention and in the appended claims.

In copending application Serial No. 428,112, filed May 6, 1954, there are described laminating solutions comprising polymerizable polyester resin compositions and water-soluble melamine-formaldehyde condensates in an aqueous, water-soluble ketone solvent.

In accordance with the present invention it has been found advantageous to emply as impregnants for cellulosic laminating stock water-in-oil emulsions comprising polymerizable polyester resin compositions and water-soluble melamine-formaldehyde condensation products.

The said polyester resin composition comprises a polymerizable polyester of a polyhydric alcohol and a polybasic acid in which at least a major proportion of the said acid is an alpha-beta unsaturated dicarboxylic acid and at least a major proportion of the said polyhydric alcohol is a dihydric alcohol conforming to the formula

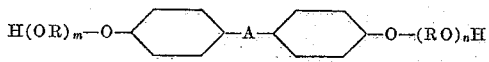

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 6.

Polyester resins so defined thus include esters of, for example, maleic, fumaric, itaconic, mesaconic and endomethylene tetrahydro phthalic acid, or mixtures of such acids with minor proportions of, for example, phthalic, succinic, adipic, sebacic, chlorinated phthalic, iso-phthalic, or terephthalic acid, and the like. The alcohol radicals of the polyesters are from diols such, for example, as the di-(hydroxy propyl) ether of 2.2-di-(4-hydroxyphenol) propane or the di-(hydroxyethyl) ether of 2.2-di-(4-hydroxyphenyl) butane, taken separately or in admixture with minor proportions of other dihydric alcohols such, for example, as ethylene glycol, propylene glycol, trimethylene glycol, the lower polyalkylene glycols, the several butylene glycols, hexylene glycols, cyclohexane diols, xylylene glycols and the like. Of the polyesters conforming to the definition preferred members for use in the laminating solution of the present invention are maleates and fumarates of symmetrical di-(hydroxyalkyl) ethers of 2.2-di-(4-hydroxyphenyl) propane. More specifically preferred is the fumarate of 2.2-di-(4-hydroxypropoxy phenyl) propane. The said members are readily friable solids at room temperature with melting points above 80° C., and preferably above 90° C.

In addition to the said polyester the polymerizable polyester composition may contain a vinyl monomer copolymerizable therewith. Among suitable vinyl monomers may be named aromatic vinyl compounds, such as styrene, vinyl toluene, or divinyl benzene; and allyl esters, such as diallyl phthalate, triallyl cyanurate, diallyl phenyl phosphonate, diallyl ester of ethylene glycol carbonate, and the like. To avoid excessive loss of the monomer upon evaporation of solvents from the emulsion after impregnation the vinyl monomers, if employed in the compositions, are selected from among those having a boiling point of at least 100° C.

In the emulsions of the invention the said polyester resin composition comprising a polyester resin and, optionally, a vinyl monomer, both as hereinbefore described are dissolved in a water-immiscible volatile solvent and the solution constitutes the oil phase of the emulsion. The preferred solvent is toluene although other aromatic hydrocarbon solvents, particularly benzene and the xylenes may be employed. Oxygenated water-immiscible solvents such as the lower aliphatic esters, particularly ethyl acetate, and water-insoluble ketones, such as methyl isobutyl ketone, may also be employed. It is obvious that the solvent must be selected with due regard to any vinyl monomer present in the combination in order that the former may be evaporated from the laminating stock impregnated with the emulsion and leave the latter behind. It is quite feasible, however, to employ aromatic vinyl compounds, particularly styrene and divinyl benzene to act both as crosslinking vinyl monomer and solvent. In such cases part of the vinyl compound is lost by evaporation during the drying step but enough is retained in the impregnated sheet to serve as the cross linker.

In addition to the components already named the oil phase of the emulsions of the invention may advantageously contain a vinyl polymerization catalyst. The catalyst is selected in accordance with the time-temperature cycle to be employed in the preparation of laminates from stock impregnated with the emulsions of the invention. Suitable catalysts include organic peroxides, "per" acids and esters of "per" acids. Among such may be named benzoyl peroxide, succinyl peroxide, peracetic acid, tertiary butyl perbenzoate and the like.

The concentration of solids in the oil phase of the emulsion may vary over a considerable range. In preferred emulsions the polyester resin composition comprises approximately 50% of said oil phase although operable impregnating emulsions may be prepared with solutions containing as low as 25% and as high as 75% solids. As has been indicated hereinbefore, the dissolved polyester resin composition may consist solely of a polymerizable polyester or may comprise such a polyester and a vinyl monomer. The said vinyl monomer may be present in proportions to yield up to 1.0 vinyl group per unsaturated acid residue in the polyester. In preferred compositions a proportion of vinyl monomer to provide from 0.5 to 0.8 vinyl groups per unsaturated acid residue in the polyester is employed.

The dispersed phase in emulsions of the invention comprises an aqueous solution of a water-soluble melamine-formaldehyde condensation product. The concentration of condensation product in the solution is preferably about 50% although operative impregnating emulsions can be prepared from solutions containing from 25% to 85% of such product.

In preparing the laminating emulsions of the invention it is preferred to first prepare the two phases separately by dissolving the water-soluble melamine-formaldehyde condensation product in water to form the aqueous phase and the polymerizable polyester resin composition in the non-aqueous solvent to form the oil phase. If a catalyst is to be employed, it is dissolved in the oil phase. Agitation is then set up in the oil phase and the aqueous phase added gradually thereto. The aqueous phase disperses readily in the resin solution to form a fine particle emulsion in which the resin solution is the continuous phase.

The separate solutions of resin and condensation product are quite stable and may be held for at least a week at ordinary temperatures without significant change. The formed emulsion may cream on prolonged standing but is readily redispersed by simple agitation. It is advisable to make up no more of the emulsion at a time than will be used in 24 hours.

Sheets of cellulosic material such, for example, as paper or woven cotton cloth may be impregnated by passing them through the emulsion and between squeeze rolls adjusted to retain the desired amount of emulsion in the sheet. The impregnated sheets are then dried, preferably at elevated temperature, after which they may be held at ordinary temperatures for periods of several weeks without advancement of the resins to the infusible state. They are of moderate flexibility and are easily handled. They may be laid up in multiple plies and subjected to heat and pressure to form laminates of good water resistance, high impact strength and excellent electrical properties. A particularly valuable property of paper laminates employing the impregnating emulsions of the invention is their punchability. Intricate sheets may be formed from such laminates in a punch press, thereby avoiding more expensive and time consuming milling or shaping procedures.

The following examples are illustrative of laminating emulsions made in accordance with the invention, and of the process of preparing cellulosic laminating stock impregnated therewith. In the examples all recited parts and percentages are by weight unless otherwise specified.

*Example 1*

100 parts of the fumarate polyester of iso-propylidene diphenol (bis)propylene glycol monoether, 20 parts of diallyl phenyl phosphonate and 4 parts of tert-butyl perbenzoate were dissolved in 100 parts toluene. This solution constitutes the oil phase of the emulsion.

Separately a 50% solution of a water-soluble melamine formaldehyde condensation product (Melmac 405) was prepared, which solution is the aqueous phase of the emulsion.

Agitation is set up in 74 weight parts of the oil phase and 26 parts of the aqueous phase are added gradually. A stable water-in-oil emulsion results which is suitable for impregnating cellulosic sheet material to form curable laminating stock.

The sheet material, paper or fabric, is passed under one or more rollers submerged in a tank of the emulsions, under a doctor blade to scrape off most of the excess emulsion and between squeeze rolls to force the impregnant well into the sheet. Solvent may be removed by air drying but it is more efficient to pass the impregnated sheet through a forced draft drying tunnel at elevated temperature (250° F. is suitable). The dried sheets, after cooling, are tack-free, and may be stacked or wound into rolls for storage.

The laminating stock so formed may be laid up in layers and subjected to heat and pressure to form cured laminates which are uniformly impregnated and strong. Suitable curing conditions for paper laminating stock impregnated with the emulsion of Example 1 are 10 minutes at 300° F. under a pressure of 625 pounds per square inch.

*Example 2*

To 100 parts of a 50% solution in toluene of the resin of Example 1 there was added under constant agitation an equal weight of a 60% solution in water of the melamine formaldehyde condensation product of Example 1. There resulted a stable water-in-oil emulsion suitable as an impregnant for laminating stock. The curing rate of the impregnated laminating stock is greatly accelerated by incorporating 5% (based on the polyester resin) of benzoyl peroxide into the oil phase before preparing the emulsion.

*Example 3*

Dissolve 100 parts of the maleate polyester 2.2-di-(4-beta hydroxyethoxyphenyl) propane, 25 parts of diallyl phthalate and 4 parts of tert-butyl perbenzoate in 100 parts of benzene. Separately prepare an aqueous solution of 20 parts of a water-soluble melamine formaldehyde condensation product in 80 parts of water and add the aqueous solution gradually to the benzene solution with continuous stirring. The resulting water-in-oil emulsion is stable and well adapted to the formation of impregnated paper stock for laminating.

*Example 4*

To 50 parts of a 50% toluene solution of the resin of Example 1 add, with continuous stirring a solution of 75 parts of a water-soluble melamine formaldehyde condensation product in 15 parts of water. A stable water-in-oil emulsion results, which is quite viscous but may be employed to impregnate paper or cloth stock for laminating. It may be thinned for application with more toluene, or styrene, or vinyl toluene if desired. A vinyl polymerization catalyst, for example, succinyl peroxide, may be dissolved in the diluting hydrocarbon or in the polyester resin solution to produce a composition which yields a faster curing laminating stock.

A particular advantage of the emulsions of the present invention is that low wet-strength paper may be readily impregnated therewith despite the considerable water content of the emulsions.

Stable water-in-oil emulsions may be produced in accordance with the invention over a very wide range of polyester resin to melamine-formaldehyde condensation product ratios. Mixtures in which the said ratio ranges from 95/5 to 2/98 have been prepared. Superior paper laminating stock is obtained when the ratio of polyester resin composition to condensation product is greater than unity and particularly when it lies between the limits of 85/15 and 60/40.

What is claimed is:

1. An emulsion comprising in the dispersed phase, an aqueous solution of a water-soluble melamine-formaldehyde condensation product and, in the continuous phase, a water-immiscible volatile solvent containing dissolved therein a resin composition comprising a polymerizable polyester of a polybasic acid of which at least the major proportion is an alpha-beta unsaturated dicarboxylic acid and a polyhydric alcohol of which at least the major proportion is a diol conforming to the formula

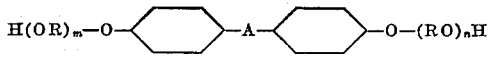

wherein R is an alkylene radical having from 2 to 3 carbon atoms, A is a 2-alkylidene radical having from 3 to 4 carbon atoms, $m$ and $n$ are each at least one, and the average sum of $m$ and $n$ is not over 6.

2. An emulsion as in claim 1 wherein the said polyester is the fumarate of a diol conforming to the said formula.

3. An emulsion as in claim 2 wherein the said polyester is the fumarate of 2.2-di(4-hydroxypropoxyphenyl) propane.

4. An emulsion comprising, in the dispersed phase, an aqueous solution of a water-soluble melamine-formaldehyde condensation product and, in the continuous phase, a water-immiscible volatile solvent containing dissolved therein a resin composition comprising a polyester resin as defined in claim 1 and a vinyl monomer which has a boiling point above 100° C. and is copolymerizable with the polyester.

5. An emulsion as in claim 4 wherein the said polyester is the fumarate of a diol conforming to the said formula.

6. An emulsion as in claim 5 wherein the said polyester is the fumarate of 2.2-di(4-hydroxypropoxyphenyl) propane and the vinyl monomer is a diallyl ester.

7. An emulsion as in claim 6 wherein the said vinyl monomer is diallyl phthalate.

8. An emulsion as in claim 6 wherein the said vinyl monomer is diallyl phenyl phosphonate.

9. An emulsion comprising, in the aqueous phase, a 25% to 85% solution in water of a water-soluble melamine-formaldehyde condensation product and, in the continuous phase, a 25% to 75% solution, in a water-immiscible volatile solvent, of a resin-composition comprising a copolymerizable mixture of a polyester as defined in claim 1 and a polymerizable vinyl monomer in proportions to yield up to 1.0 vinyl groups per unsaturated acid residue in the polyester.

10. An emulsion in which the dispersed phase consists essentially of an aqueous solution of a water-soluble melamine-formaldehyde condensation produce and the continuous phase consists essentially of a toluene solution of a resin composition consisting of 2.2-di(4-hydroxypropoxyphenyl) propane, diallyl phthalate, and a vinyl polymerization catalyst, wherein the proportion of said resin composition to said condensation product lies between the limits of 85/15 and 60/40 and wherein the diallyl phthalate furnishes from 0.5 to 0.8 vinyl groups per fumaric acid residue in the said polyester.

11. A process for preparing cellulosic laminating stock which comprises impregnating cellulosic sheet material by dipping in emulsion of claim 1, removing excess emulsion therefrom, and drying the impregnated sheets.

No references cited.